United States Patent
Devi et al.

(10) Patent No.: US 10,565,301 B2
(45) Date of Patent: Feb. 18, 2020

(54) STATEFUL EDITING OF RICH CONTENT USING A BASIC TEXT BOX

(75) Inventors: Renu Devi, Redmond, WA (US); Barnabas Whitfield, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 649 days.

(21) Appl. No.: 13/588,591

(22) Filed: Aug. 17, 2012

(65) Prior Publication Data
US 2014/0053068 A1 Feb. 20, 2014

(51) Int. Cl.
*G06F 17/24* (2006.01)

(52) U.S. Cl.
CPC .................... *G06F 17/241* (2013.01)

(58) Field of Classification Search
CPC ............... G06F 17/241; G06F 17/24
USPC .................. 715/255, 256, 249, 269
See application file for complete search history.

(56) References Cited

U.S. PATENT DOCUMENTS

| | | | |
|---|---|---|---|
| 5,579,466 A * | 11/1996 | Habib et al. ................ | 715/210 |
| 6,044,387 A | 3/2000 | Angiulo et al. | |
| 6,558,431 B1 * | 5/2003 | Lynch ................ | G06F 17/3089 |
| | | | 707/E17.116 |
| 7,191,405 B1 * | 3/2007 | Jaramillo ................ | G06F 8/33 |
| | | | 715/201 |
| 8,566,704 B1 * | 10/2013 | Le Bescond de Coatpont et al. ............... | 715/234 |
| 8,645,105 B1 * | 2/2014 | Shepherd et al. ................ | 703/1 |
| 8,869,051 B2 * | 10/2014 | Yu et al. ................ | 715/763 |
| 2002/0069204 A1 * | 6/2002 | Kahn ................ | G06F 17/24 |
| 2004/0019849 A1 | 1/2004 | Weng et al. | |
| 2004/0225672 A1 | 11/2004 | Landers et al. | |
| 2007/0067714 A1 | 3/2007 | Lin | |
| 2007/0083811 A1 * | 4/2007 | Matsuo ................ | G06F 17/243 |
| | | | 715/246 |
| 2007/0239760 A1 | 10/2007 | Simon | |
| 2009/0259949 A1 * | 10/2009 | Verlaan ................ | G06F 17/2247 |
| | | | 715/760 |

FOREIGN PATENT DOCUMENTS

CN        1940845 A      4/2007

OTHER PUBLICATIONS

"International Search Report & Written Opinion for PCT Patent Application No. PCT/US2013/054597", dated Feb. 19, 2014, Filed Date: Aug. 13, 2013, 11 Pages.
"Creating an Input Method Android Developers", Published on: Aug. 15, 2012, Available at: http://web.archive.org/web/20120815115159/http://developer.android.com/guide/topics/text/creating-input-method.html, 12 pgs.

(Continued)

*Primary Examiner* — Stephen S Hong
*Assistant Examiner* — Matthew J Ludwig
(74) *Attorney, Agent, or Firm* — Merchant & Gould P.C.

(57) ABSTRACT

Stateful editing of rich content in an electronic document using a text box, may be provided. Multiple inputs may be received in a text box for updating the rich content. The rich content may include both text content and non-text content displayed in the electronic document. An update may be determined for applying to the rich content based on the multiple inputs in the text box. The update may then be applied to the rich content.

16 Claims, 7 Drawing Sheets

(56) References Cited

OTHER PUBLICATIONS

Bostandjiev, et al., "WiGipedia: A Tool for Improving Structured Data in Wikipedia", In Proceedings of the IEEE Fifth International Conference on Semantic Computing, Sep. 18, 2011, pp. 328-335.
"First Office Action and Search Report Issued in Chinese Patent Application No. 201380043538.4", dated Aug. 24, 2016, 14 Pages.
European Official Communication in Application 13753939.1, dated Mar. 24, 2015, 2 pgs.
"Second Office Action and Search Report Issued in Chinese Patent Application No. 201380043538.4", dated Mar. 9, 2017, 14 Pages.
"Notice of Allowance Issued in Chinese Patent Application No. 201380043538.4", dated Mar. 15, 2018, 4 Pages.
"Office Action Issued in European Patent Application No. 13753939.1", dated Jun. 29, 2018, 5 Pages.
"Summons to Attend Oral Proceeding Issued in European Patent Application No. 13753939.1", dated May 6, 2019, 7 Pages.
"Third Office Action Issued in Chinese Patent Application No. 201380043538.4", dated Aug. 11, 2017, 6 Pages.

* cited by examiner

STATEFUL EDITING OF RICH CONTENT USING A BASIC TEXT BOX

COPYRIGHT NOTICE

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer software applications may be configured for the editing of rich content in an electronic document. For example, an electronic document (e.g., a web page) may contain both text and non-text content (i.e., graphics). In order for a user to edit text surrounding the non-text content, the aforementioned software applications generate a text box for a user to enter characters. Each time a user makes a keystroke in the text box, a new character is found and inserted into the electronic document for viewing by the user. The text box is then cleared for the next character to arrive. Thus, each time a character is entered into the text box by a user, the text box is cleared for entry of a subsequent character. Text entry continues in this manner until the user has completed entry of a desired word, sentence or paragraph. The aforementioned text entry method for rich content however, suffers from a number of drawbacks. For example, one drawback is that because text is cleared from the text box after the entry of each character, a state of the intended text entry (e.g., a word, sentence or paragraph) is not maintained. This interferes with external software tools that expect to view a full text entry (e.g., a word, sentence or paragraph) which would normally be viewed by a user (and thus need to maintain state). In particular, input method editor ("IME") and screen reader tools will not function when typed text is interfered with in this manner. For example, IME software enables users to input text in a language made up of complex sets of glyphs (e.g., Chinese) on keyboards that do not support the full range of symbols for the language and thus require several keystrokes to represent a single character. Since current text editors for rich content do not maintain state, the editing of characters comprising multiple glyphs may not be accomplished. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for stateful editing of rich content in an electronic document using a text box. Multiple inputs may be received in a text box for updating the rich content. The rich content may include both text content and non-text content displayed in the electronic document. An update may be determined for applying to the rich content based on the multiple inputs in the text box. The update may then be applied to the rich content.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for stateful editing of rich content in an electronic document using a text box. Multiple inputs may be received in a text box for updating the rich content. The rich content may include both text content and non-text content displayed in the electronic document. An update may be determined for applying to the rich content based on the multiple inputs in the text box. The update may then be applied to the rich content.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
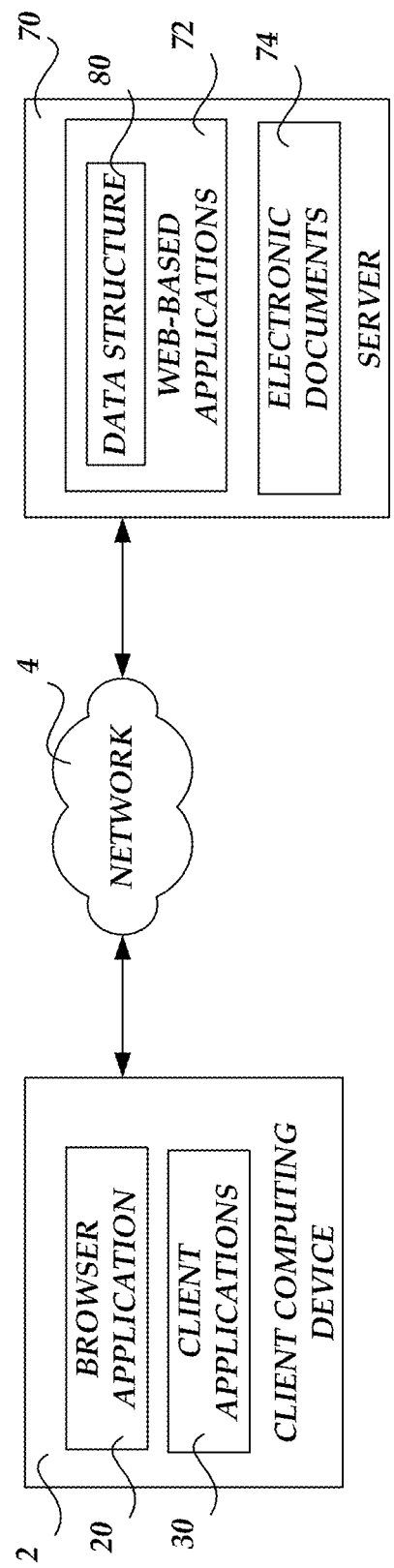
FIG. 1 is a block diagram illustrating a network architecture for stateful editing of rich content in an electronic document using a text box, in accordance with various embodiments.

Referring now to the drawings, in which like numerals represent like elements through the several figures, various aspects of the present invention will be described. FIG. 1 is a block diagram illustrating a network architecture for stateful editing (i.e., maintaining state) of rich content in an electronic document using a text box, in accordance with various embodiments. The network architecture includes a client computing device 2 in communication with a server 70 over a network 4. The network 4 may include a local network or a wide area network (e.g., the Internet). The client computer 2 may include a browser application 20 and a client applications 30. The server 70 may include a web-based application 72 and electronic documents 74. The browser application 20 may be utilized to generate a web browser for accessing, viewing and editing the electronic documents 74 via the web-based applications 72 over the network 4. In accordance with an embodiment, the browser application 20 may comprise the INTERNET EXPLORER web browser developed by MICROSOFT CORPORATION of Redmond, Wash. It should be understood, however, that other browser applications from other manufacturers may also be utilized without departing from the spirit and scope of the embodiments described herein. The client applications 30 may be utilized to create electronic documents (such as the electronic documents 74) and store them locally on the client computing device 2 and/or remotely on the server 70. It should be understood that the client applications 30 may include, without limitation, a number of different types of productivity application software including word processing software, presentation graphics software, spreadsheet software, diagramming software, project management software, publishing software, personal information management software and note-taking software. In accordance with an embodiment, the client applications 30 may comprise one or more of the following software applications: the WORD word processing software and the ONENOTE note-taking software from MICROSOFT CORPORATION of Redmond Wash. It should be appreciated that the aforementioned software applications may comprise individual application programs or alternatively, may be incorporated into a suite of applications such as the OFFICE application program suite from MICROSOFT CORPORATION. The electronic documents 74 may comprise web pages containing rich content (i.e., a combination of text and non-text content). It should be understood, that in accordance with an embodiment, the server 70 may comprise a file hosting service that allows users to upload and synchronize files to a network (e.g., "cloud") storage and then access them from a web browser or a local client computing device. An illustrative file hosting service is the SKYDRIVE file hosting service developed by MICROSOFT CORPORATION of Redmond, Wash. It should be understood, however, that other file hosting services may also be utilized without departing from the spirit and scope of the embodiments described herein. In accordance with an embodiment and as will be described in greater detail below, the web-based applications 72 may provide for the stateful editing of rich content in the electronic documents 74 within a text box in the browser application 20 on the client computing device 2. The web-based applications 72 may comprise a data structure 80 which may be utilized to track which parts of the text in the aforementioned text box correspond to a "text run" (i.e., a set of continuous characters that all share the same properties). In accordance with an embodiment, the web-based applications 72 may comprise web-based versions of productivity application software, including, but not limited to, word processing and note-taking software such as the WORD and ONENOTE web applications (i.e., Web Apps.) from MICROSOFT CORPORATION of Redmond Wash. It should be appreciated that the aforementioned software applications may comprise individual application programs or alternatively, may be incorporated into a suite of applications such as the OFFICE WEB APPS productivity suite from MICROSOFT CORPORATION. In accordance with other embodiments the web-based applications 72 may comprise blogging applications, social networking services and the like. It should be understood, however, that the embodiments described herein may also be practiced in conjunction with other application programs and further, is not limited to any particular application or application suite.

Figure 2:
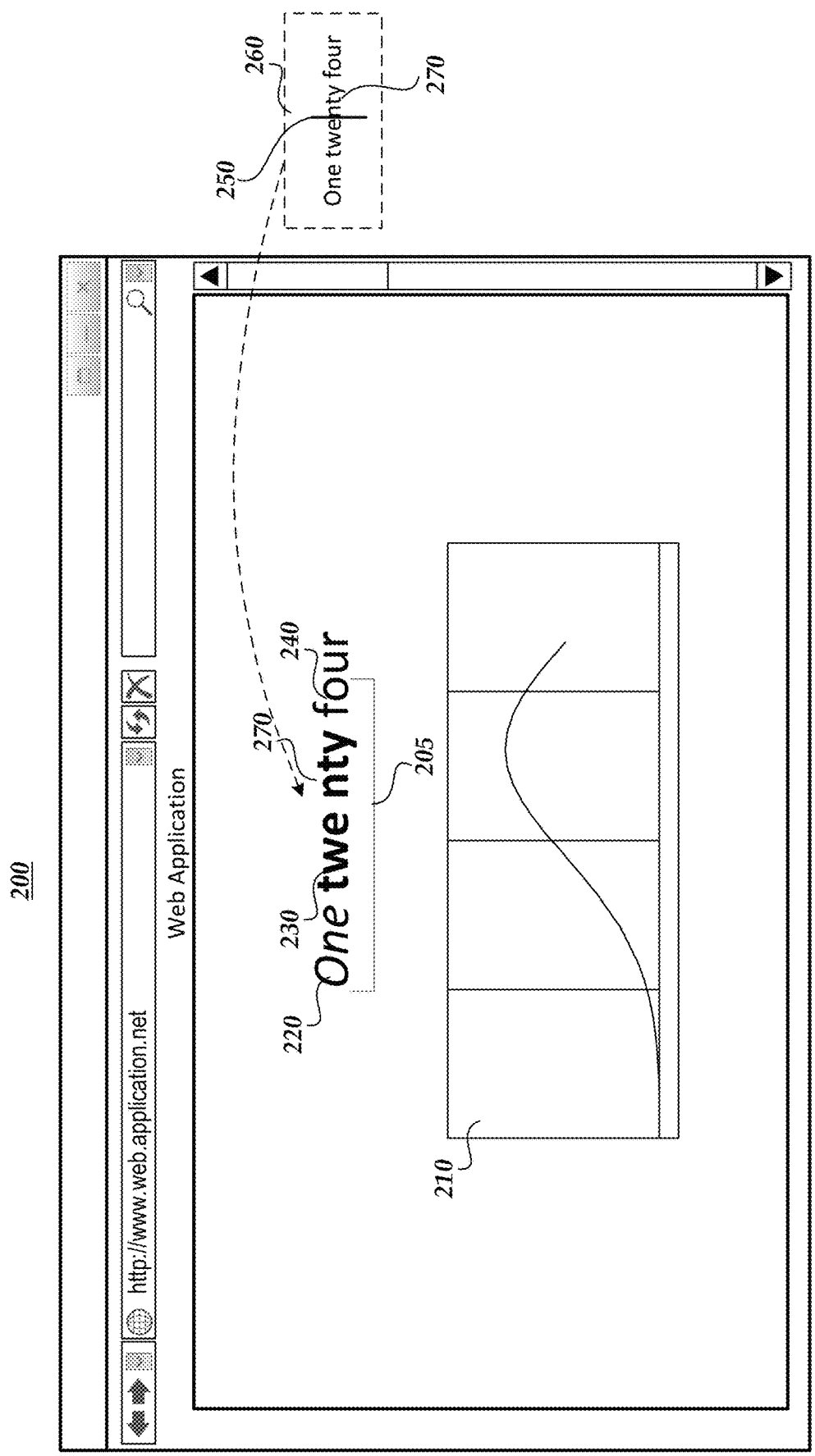
FIG. 2 shows a computer screen display of an application user interface and a text box for editing rich content in an electronic document, in accordance with an embodiment.

FIG. 2 shows a computer screen display of an application user interface 200 and a text box for editing rich content in an electronic document, in accordance with an embodiment. The application user interface 200 may be generated by the web-based applications 72 for viewing and editing the electronic documents 74 in the browser application 20. The application user interface 200 includes rich content which is comprised of text content 205 and non-text content 210. The text content 205 comprises "text runs" 220, 230 and 240. As briefly discussed above with respect to FIG. 1, a "text run" is set of continuous characters that all share the same properties. Thus, the text run 220 comprising the characters "One" represents a text run because all of the characters share formatting properties (i.e., italic formatting) which is different from text run 230 (in which all of the characters are displayed having bold formatting) and text run 240 (in which all of the characters are displayed having no formatting). It should be understood that in accordance with various embodiments, the text content 205 may comprise text characters (including glyphs and emoticons). For example, the text characters may include glyphs corresponding to one or more languages which utilize several symbols to represent single text character such as those utilized in the Chinese and Japanese languages. FIG. 2 further shows a text box 260 which may be utilized for entering text content 270 (e.g., the characters "nty") into the text run 230 of the rich content displayed in the application user interface 200. In particular, as text is entered beginning from insertion point 250 in the text box 260, the text content 205 is updated with the received input. It should be understood that any text content which is input into the text box 260 may represent one or more of an addition, removal or replacement of existing text in one or more of the text runs 220, 230 and 240 making up the text content 205. In accordance with an embodiment, the text box 260 may be hidden from view such that it is invisible to a user of the web-based applications 72. Thus, when a user makes edits to the text content 205 in the application user interface 200, the input (e.g., the text content 270) is initially received in the hidden text box 260 as unformatted text and then inserted into the text content 205 portion of the rich content, with the appropriate formatting applied, as determined by the web-based applications 72. The details of the aforementioned determination by the web-based applications 72 will be described in greater detail below with respect to FIG. 3.

Figure 3:
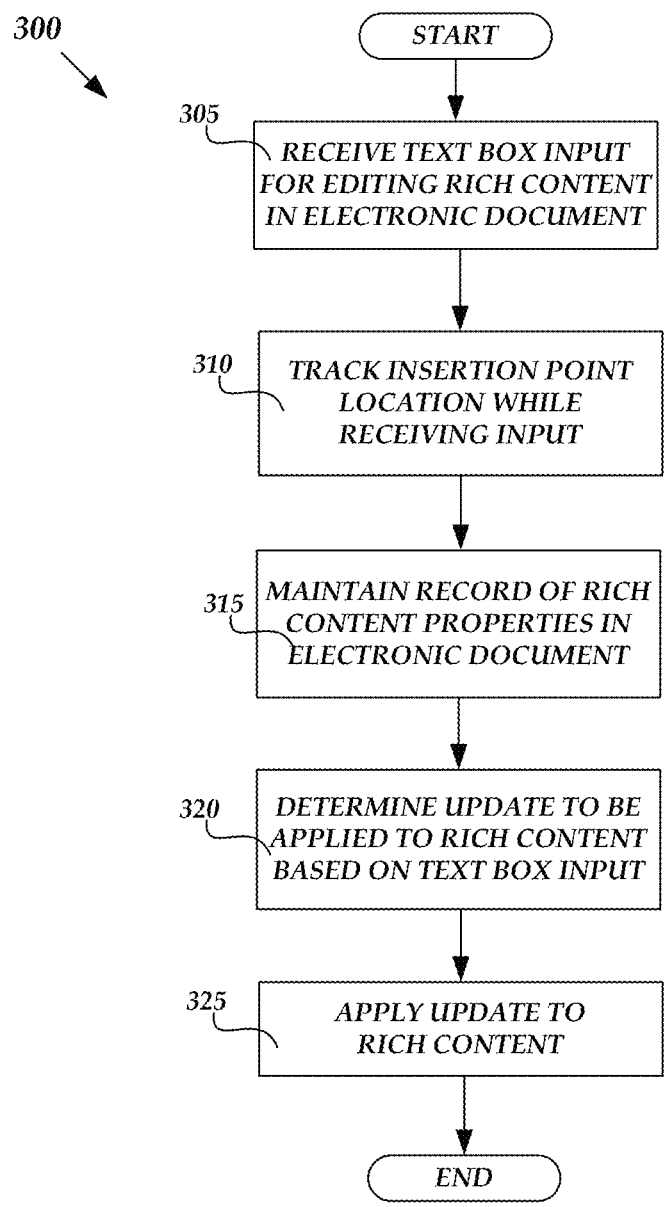
FIG. 3 is a flow diagram illustrating a routine for stateful editing of rich content in an electronic document using a text box, in accordance with an embodiment.

FIG. 3 is a flow diagram illustrating a routine illustrating a routine 300 for stateful editing of rich content in an electronic document using a text box, in accordance with an embodiment. When reading the discussion of the routine presented herein, it should be appreciated that the logical operations of various embodiments of the present invention are implemented (1) as a sequence of computer implemented acts or program modules running on a computing device or system, and/or (2) as interconnected machine logical circuits or circuit modules within the computing device or system. The implementation is a matter of choice dependent on the performance requirements of the computing device or system implementing the invention. Accordingly, the logical operations illustrated in FIG. 3 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the web-based applications 72 executing on the server 70 receives a text box input for editing rich content in electronic document from a user of the computing device 2. In accordance with an embodiment, the text box may be hidden from view from the user and the text box input may comprise unformatted text (e.g., unformatted multiple text characters or glyphs) for updating the rich content in the electronic document.

From operation 305, the routine 300 continues to operation 310, where the web-based applications 72 executing on the server 70 may track an insertion point location in the text box while the input (discussed above with respect to operation 300) is being received. In particular, the web-based applications 72 may utilize the data structure 80 to track the location of an insertion point for editing text in the rich content. It should be understood that the tracking of the insertion point (which may also be referred to as selection tracking) may be utilized to inform the web-based applications 72 where the next character is likely to show up in text content (e.g., a paragraph) within rich content displayed in an electronic document.

From operation 310, the routine 300 continues to operation 315, where the web-based applications 72 executing on the server 70 may maintain a record of rich content properties in electronic document. In particular, the web-based applications 72 may utilize the data structure 80 to perform a record keeping function with respect to the properties (e.g., formatting) of text content (e.g., a paragraph) within the rich content displayed in an electronic document. For example, the data structure 80 may be utilized to keep track of which parts of text comprising the input received in the text box (discussed above with respect to operation 300) corresponds to parts of the overall electronic document containing the rich content being edited. As a specific non-limiting example, a paragraph in an electronic document which a user is editing may contain a word having bold formatting in the midst of unformatted text. As the user begins typing text in or around the bold word, the data structure 80 may be configured (utilizing the selection tracking and record keeping functionality described above) to keep track of whether or not the new characters being entered are part of the bold word or alternatively, part of the unformatted text in the paragraph. As another non-limiting example, text content which a user may wish to edit in an electronic document may also comprise an image within the text. Since the text box for receiving the user input is limited only to receiving edited text (and not images), in this scenario, the data structure 80 may be configured (utilizing the selection tracking and record keeping functionality described above) to track a location in the text content that corresponds with the image. Thus, as a user starts typing in and around the tracked location, the data structure 80 is able to maintain knowledge as to whether any new text characters being added by the user will be inserted before or after the image in the text content.

From operation 315, the routine 300 continues to operation 320, where the web-based applications 72 executing on the server 70 may determine an update to be applied to the rich content in the electronic document based on the text box input received at operation 305. In particular, the web-based applications 72 may include and be configured to carry out a "text diffing" algorithm to determine differences between the text box input and existing text content. For example, the text diffing algorithm may include comparing the text input received in the text box to the text content in the electronic document and identifying additions, removals or replacements of text in the electronic document based on the comparison. It should be understood, that in accordance with an embodiment, the text diffing algorithm may be utilized to resolve ambiguity with respect to repeated occurrences of text within rich content which may occur, for example, when a user deletes an instance of repeated text adjacent to an insertion point (e.g., the user deletes the third occurrence of the letter "a" in the text run "aaaa"). In this instance the diffing algorithm may determine which instance of the letter "a" was deleted by choosing one of the characters in the text run as deleted text.

From operation 320, the routine 300 continues to operation 325, where the web-based applications 72 executing on the server 70 may apply the update determined at operation 320, to the rich content in the electronic document. In particular, the web-based applications 72 may be configured to identifying all of the text runs in the rich content. As discussed above with respect to FIG. 2, each text run in the electronic document has a different property (e.g., formatting, etc.). The web-based applications 72 may then identify an insertion point in the rich content for the received text box input, identify, based on the insertion point, a corresponding text run in the rich content for receiving the text box input, and insert the text box input into the corresponding text run. For example, as discussed above, the web-based applications 72 may utilize the data structure 80 to track an insertion point location for text edits received in the text box with respect to text runs in the rich content. Thus, if the insertion point location is adjacent a text run having bold formatting, the web-based applications 72 may insert the received text edits from the text box into the rich content with bold formatting. From operation 325, the routine 300 then ends.

Figure 4:
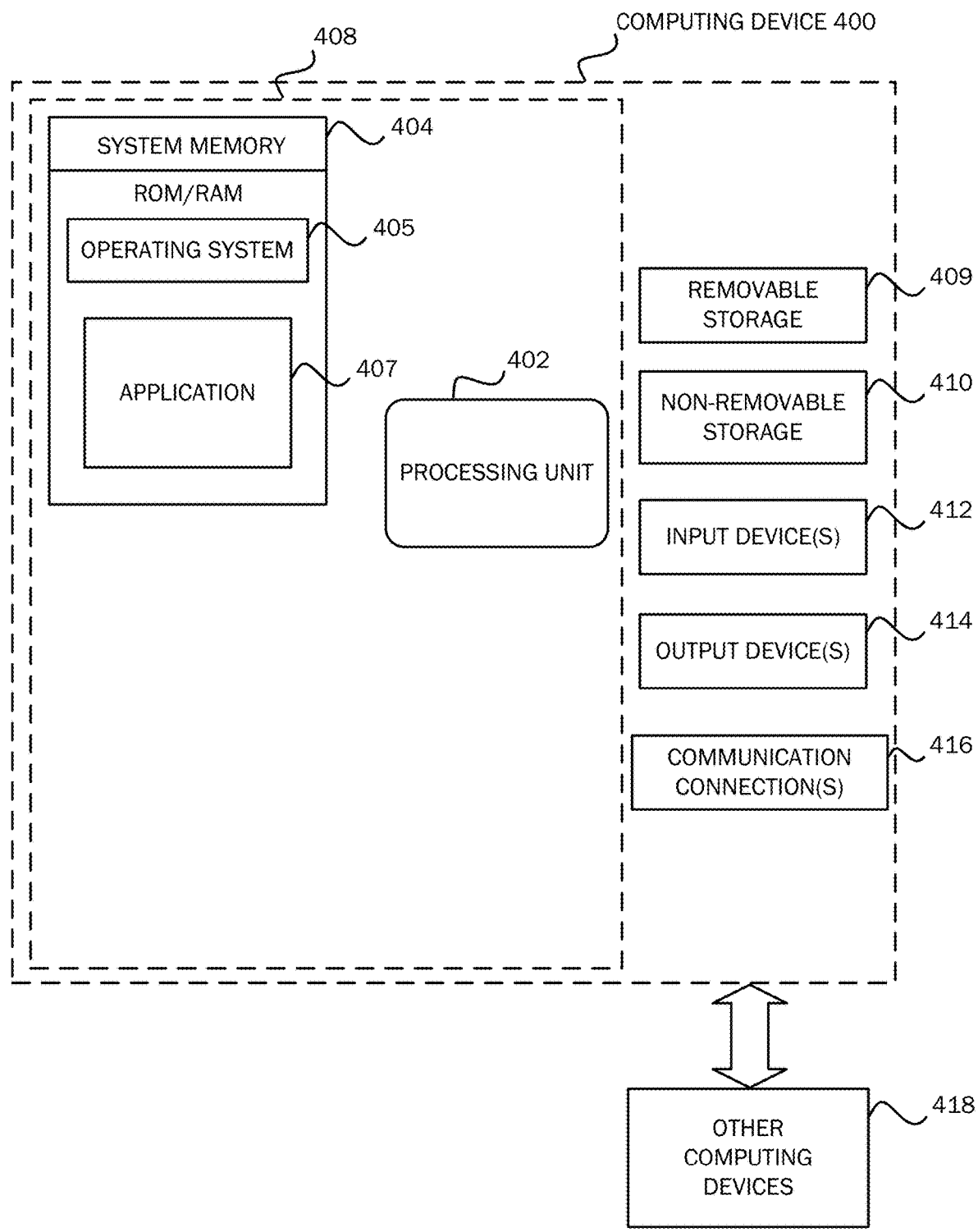
FIG. 4 is a simplified block diagram of a computing device with which various embodiments may be practiced.

FIG. 4 is a block diagram illustrating example physical components of a computing device 400 with which various embodiments may be practiced. The computing device components described below may be suitable for the computing device referenced above with respect to FIGS. 1-3. In a basic configuration, the computing device 400 may include at least one hardware processing unit 402 and a system memory 404. Depending on the configuration and type of computing device, system memory 704 may comprise, but is not limited to, volatile (e.g. random access memory (RAM)), non-volatile (e.g. read-only memory (ROM)), flash memory, or any combination. System memory 404 may include an operating system 405 and application 407. Operating system 405, for example, may be suitable for controlling computing device 400's operation and, in accordance with an embodiment, may comprise the WINDOWS operating systems from MICROSOFT CORPORATION of Redmond, Wash. The application 407, for example, may comprise a number of different types of productivity application software including, but not limited to, word processing software, presentation graphics software, spread sheet software, diagramming software, project management software, publishing software, personal information management software and note-taking software. In accordance with an embodiment, the application 407 may comprise one or more of the following software applications: the WORD word processing software, POWERPOINT presentation graphics software, EXCEL spreadsheet software, VISIO diagramming software, PROJECT project management software, PUBLISHER publishing software, OUTLOOK personal information management software and the ONENOTE note-taking software from MICROSOFT CORPORATION of Redmond Wash. It should be appreciated that the aforementioned software applications may comprise individual application programs or alternatively, may be incorporated into a suite of applications such as the OFFICE application program suite from MICROSOFT CORPORATION. It should be understood, however, that the embodiments described herein may also be practiced in conjunction with other operating systems and application programs and further, is not limited to any particular application or system.

The computing device 400 may have additional features or functionality. For example, the computing device 400 may also include additional hardware data storage devices (removable and/or non-removable) such as, for example, magnetic disks, optical disks, solid state storage devices ("SSD"), flash memory or tape. Such additional storage is illustrated in FIG. 4 by a removable storage 409 and a non-removable storage 410.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 400 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 400. Any such computer storage media may be part of the computing device 400. The computing device 400 may also have input device(s) 412 such as a keyboard, a mouse, a pen, a sound input device (e.g., a microphone) for receiving a voice input, a touch input device for receiving gestures, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
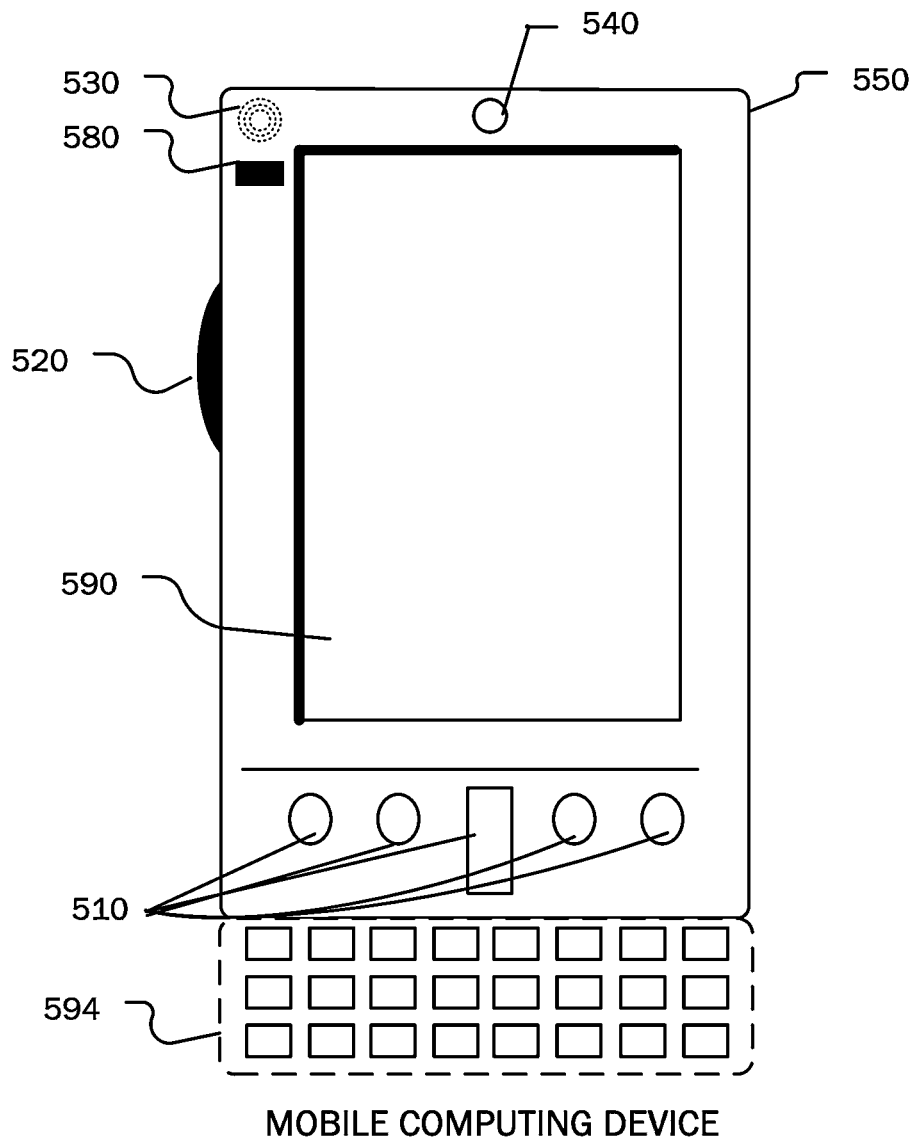
FIG. 5A is a simplified block diagram of a mobile computing device with which various embodiments may be practiced.
Figure 5B:
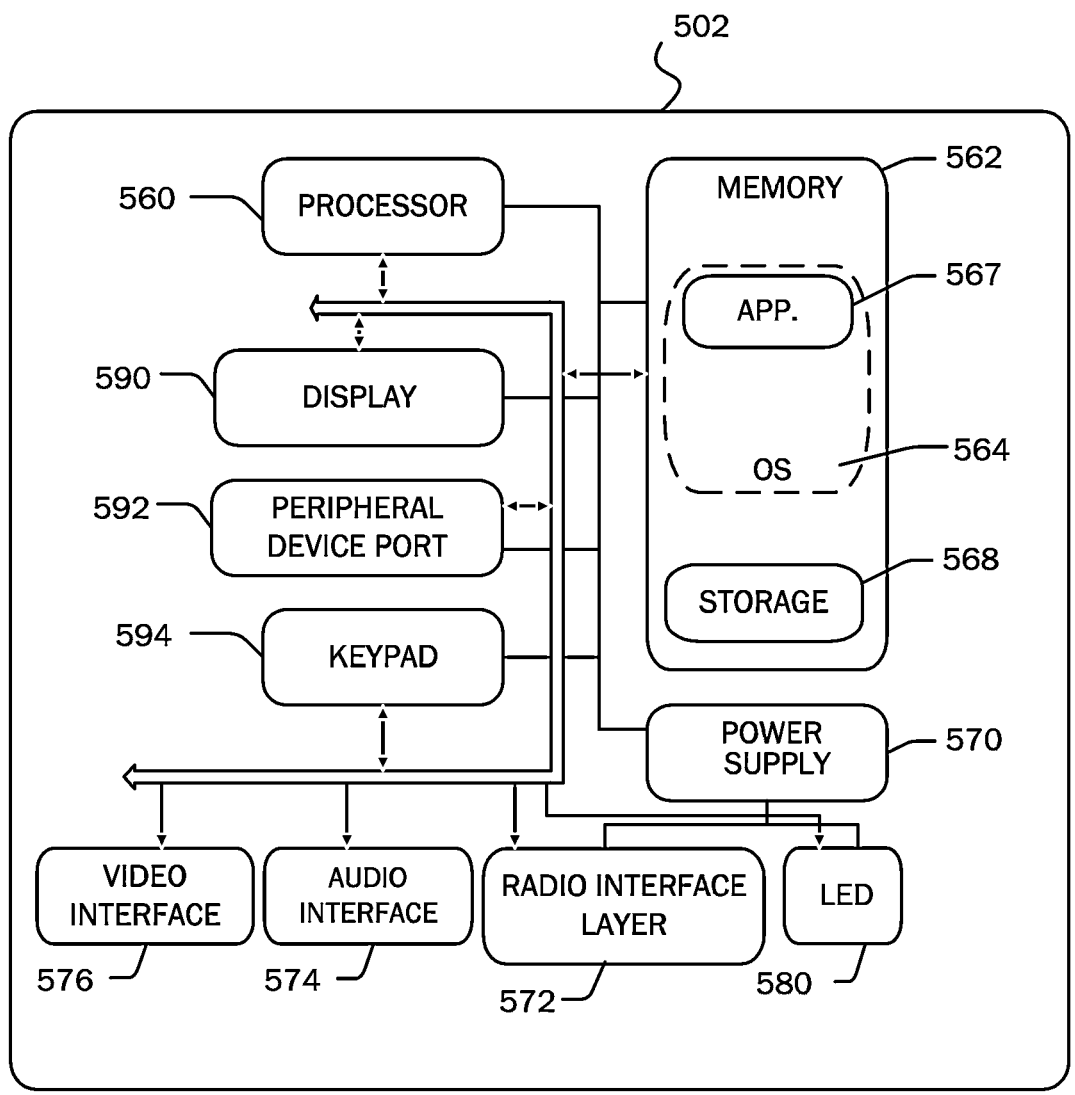
FIG. 5B is a simplified block diagram of a mobile computing device with which various embodiments may be practiced.

FIGS. 5A and 5B illustrate a suitable mobile computing environment, for example, a mobile computing device 550 which may include, without limitation, a smartphone, a tablet personal computer, a laptop computer, and the like, with which various embodiments may be practiced. With reference to FIG. 5A, an example mobile computing device 550 for implementing the embodiments is illustrated. In a basic configuration, mobile computing device 550 is a handheld computer having both input elements and output elements. Input elements may include touch screen display 525 and input buttons 510 that allow the user to enter information into mobile computing device 550. Mobile computing device 550 may also incorporate an optional side input element 520 allowing further user input. Optional side input element 520 may be a rotary switch, a button, or any other type of manual input element. In alternative embodiments, mobile computing device 550 may incorporate more or less input elements. For example, display 525 may not be a touch screen in some embodiments. In yet another alternative embodiment, the mobile computing device is a portable telephone system, such as a cellular phone having display 525 and input buttons 510. Mobile computing device 550 may also include an optional keypad 505. Optional keypad 505 may be a physical keypad or a "soft" keypad generated on the touch screen display.

Mobile computing device 550 incorporates output elements, such as display 525, which can display a graphical user interface (GUI). Other output elements include speaker 530 and LED light 526. Additionally, mobile computing device 550 may incorporate a vibration module (not shown), which causes mobile computing device 550 to vibrate to notify the user of an event. In yet another embodiment, mobile computing device 550 may incorporate a headphone jack (not shown) for providing another means of providing output signals.

Although described herein in combination with mobile computing device 550, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 5B is a block diagram illustrating components of a mobile computing device used in one embodiment, such as the mobile computing device 550 shown in FIG. 5A. That is, mobile computing device 550 can incorporate a system 502 to implement some embodiments. For example, system 502 can be used in implementing a "smart phone" or tablet computer that can run one or more applications similar to those of a desktop or notebook computer. In some embodiments, the system 502 is integrated as a computing device, such as an integrated personal digital assistant (PDA) and wireless phone.

Application 567 may be loaded into memory 562 and run on or in association with an operating system 564. The system 502 also includes non-volatile storage 568 within memory the 562. Non-volatile storage 568 may be used to store persistent information that should not be lost if system 502 is powered down. The application 567 may use and store information in the non-volatile storage 568. A synchronization application (not shown) also resides on system 502 and is programmed to interact with a corresponding synchronization application resident on a host computer to keep the information stored in the non-volatile storage 568 synchronized with corresponding information stored at the host computer. As should be appreciated, other applications may also be loaded into the memory 562 and run on the mobile computing device 550.

The system 502 has a power supply 570, which may be implemented as one or more batteries. The power supply 570 might further include an external power source, such as an AC adapter or a powered docking cradle that supplements or recharges the batteries.

The system 502 may also include a radio 572 (i.e., radio interface layer) that performs the function of transmitting and receiving radio frequency communications. The radio 572 facilitates wireless connectivity between the system 502 and the "outside world," via a communications carrier or service provider. Transmissions to and from the radio 572 are conducted under control of OS 564. In other words, communications received by the radio 572 may be disseminated to the application 567 via OS 564, and vice versa.

The radio 572 allows the system 502 to communicate with other computing devices, such as over a network. The radio 572 is one example of communication media. The embodiment of the system 502 is shown with two types of notification output devices: an LED 580 that can be used to provide visual notifications and an audio interface 574 that can be used with speaker 530 to provide audio notifications. These devices may be directly coupled to the power supply 570 so that when activated, they remain on for a duration dictated by the notification mechanism even though processor 560 and other components might shut down for conserving battery power. The LED 580 may be programmed to remain on indefinitely until the user takes action to indicate the powered-on status of the device. The audio interface 574 is used to provide audible signals to and receive audible signals from the user. For example, in addition to being coupled to speaker 530, the audio interface 574 may also be coupled to a microphone (not shown) to receive audible input, such as to facilitate a telephone conversation. In accordance with embodiments, the microphone may also serve as an audio sensor to facilitate control of notifications. The system 502 may further include a video interface 576 that enables an operation of on-board camera 540 to record still images, video streams, and the like.

A mobile computing device implementing the system 502 may have additional features or functionality. For example, the device may also include additional data storage devices (removable and/or non-removable) such as, magnetic disks, optical disks, or tape. Such additional storage is illustrated in FIG. 5B by storage 568.

Data/information generated or captured by the mobile computing device 550 and stored via the system 502 may be stored locally on the mobile computing device 550, as described above, or the data may be stored on any number of storage media that may be accessed by the device via the radio 572 or via a wired connection between the mobile computing device 550 and a separate computing device associated with the mobile computing device 550, for example, a server computer in a distributed computing network such as the Internet. As should be appreciated such data/information may be accessed via the mobile computing device 550 via the radio 572 or via a distributed computing network. Similarly, such data/information may be readily transferred between computing devices for storage and use according to well-known data/information transfer and storage means, including electronic mail and collaborative data/information sharing systems.

Figure 6:
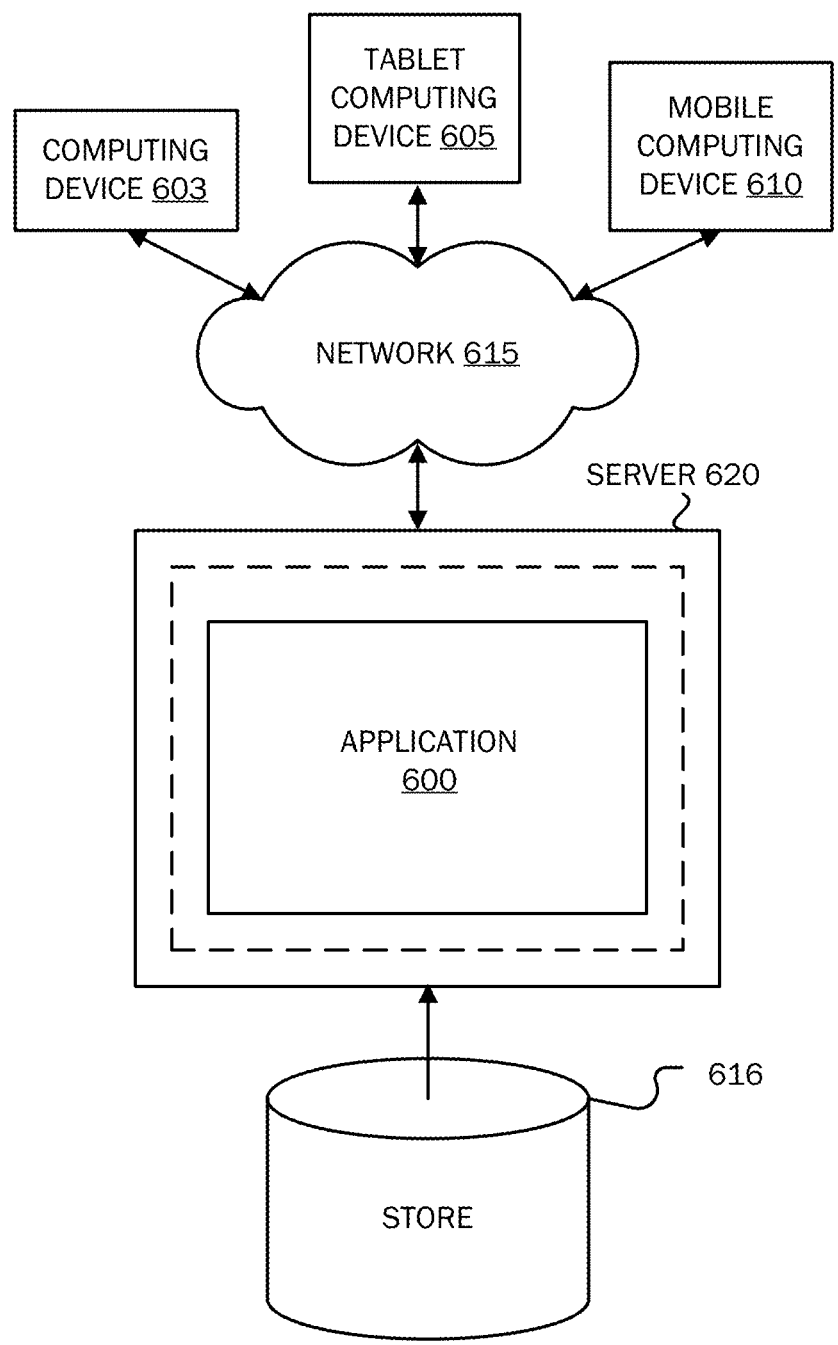
FIG. 6 is a simplified block diagram of a distributed computing system in which various embodiments may be practiced.

FIG. 6 is a simplified block diagram of a distributed computing system in which various embodiments may be practiced. The distributed computing system may include number of client devices such as a computing device 603, a tablet computing device 605 and a mobile computing device 610. The client devices 603, 605 and 610 may be in communication with a distributed computing network 615 (e.g., the Internet). A server 620 is in communication with the client devices 603, 605 and 610 over the network 615. The server 620 may store application 600 which may be perform routines including, for example, one or more of the operations in the routine 300 described above.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routine's operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A computer-implemented method for stateful editing of rich content in an electronic document using a text box, comprising:
   receiving, by a computer, a plurality of inputs to content in the text box for updating the rich content, the rich content comprising both formatted text content and non-text content displayed in the electronic document, wherein the electronic document is a webpage and wherein the plurality of inputs in the text box include only unformatted text;
   tracking, by the computer, an insertion point location in the text box while receiving the plurality of inputs;
   maintaining a record of formatting properties of the rich content in the electronic document;
   determining, by the computer, an update to be applied to the rich content based on the plurality of inputs, wherein determining the update to be applied comprises:
      comparing the unformatted text of the plurality of inputs received in the text box to the formatted text content in the electronic document; and
      identifying additions, removals or replacements of the formatted text in the electronic document based on the comparison; and
   in response to determining the update to be applied to the rich content, applying, by the computer, the update to the rich content of the webpage, wherein applying the update to the rich content of the webpage comprises:
      identifying a plurality of text runs in the rich content;
      identifying, based on the insertion point, one of the plurality of text runs in the rich content for receiving the plurality of inputs in the text box;
      formatting, based on the record of formatting properties, the plurality of inputs to be consistent with a format associated with the one of the plurality of text runs; and
      inserting the formatted plurality of inputs from the text box into the identified one of the plurality of text runs consistent with the identified additions, removals or replacements of the formatted text.

2. The method of claim 1, wherein the record of properties comprise formatting.

3. The method of claim 2, wherein applying, by the computer, the update to the rich content comprises:
   formatting the unformatted text based at least on at least one of the insertion point or the identified one of the plurality of text runs.

4. The method of claim 1, wherein all of the plurality of inputs in the text box comprises receiving unformatted text.

5. The method of claim 1, wherein the unformatted text comprises receiving one or more glyphs.

6. The method of claim 1, wherein the text content comprises a plurality of text runs, and
   wherein a first one of the plurality of text runs comprises a first set of continuous and consecutive text characters which share a first common formatting and a second one of the plurality of text runs comprises a second set of continuous and consecutive characters which share a second common formatting that is different from the first common formatting in the first one of the plurality of text runs.

7. The method of claim 1, wherein the text box is hidden from view as the plurality of inputs are received.

8. A computing device for stateful editing of rich content in an electronic document using a text box, comprising:
   a memory for storing executable program code; and
   a processor, functionally coupled to the memory, the processor being responsive to computer-executable instructions contained in the program code and operative to:
      receive a plurality of inputs comprising unformatted text content in the text box for updating formatted text content in the rich content, the rich content comprising both formatted text content and non-text content displayed in the electronic document, wherein the electronic document is a webpage and wherein the text box is hidden from view as the plurality of unformatted text is received;
      track an insertion point location in the text box while receiving the plurality of inputs to the content in the text box;
      maintain a record of formatting properties of the rich content in the electronic document;
      compare the unformatted text content of the plurality of inputs received in the text box to the formatted text content in the electronic document to identify additions, removals or replacement for the formatted text content and using the record of formatting properties of the rich content to identify formatting properties associated with the formatted text content to be applied to the unformatted text content; and
      determine an update to be applied to the rich content based on tracking the insertion point location in the text box associated with each input to the content in the text box and comparing the comparison of the unformatted text content to the formatted text content in response to the update determination, apply the update to the rich content in the webpage, wherein applying the update to the rich content of the webpage comprises:
         identifying a plurality of text runs in the rich content;
         identifying, based on the insertion point, one of the plurality of text runs in the rich content for receiving the plurality of inputs in the text box;
         formatting, based on the identified formats properties, the plurality of inputs, to be consistent with a formatting property associated with the one of the plurality of text runs; and
         inserting the formatted plurality of inputs from the text box into the identified one of the plurality of text runs consistent with the identified additions, removals or replacements of the formatted text.

9. The computing device of claim 8, wherein the processor is further operative to:
   utilize a data structure to track an insertion point location while receiving the plurality of inputs; and
   maintaining a record of properties of the rich content in the electronic document.

10. The computing device of claim 9, wherein the processor, in applying the update to the rich content, is further operative to:
   identify the plurality of text runs in the rich content, each of the plurality of text runs having a different property;
   identify an insertion point in the rich content for one or more of the plurality of inputs received in the text box;
   identify, based on the insertion point, one of the plurality of text runs in the rich content for receiving the one or more of the plurality of inputs in the text box; and insert the one or more of the plurality of inputs from the text box into the identified one of the plurality of text runs.

11. The computing device of claim 8, wherein the processor, in receiving unformatted text, is operative to receive one or more glyphs.

12. The computing device of claim 8, wherein the text content comprises a plurality of text runs, and
   wherein a first one of the plurality of text runs comprises a first set of continuous and consecutive text characters which share a first common formatting and a second one of the plurality of text runs comprises a second set of continuous and consecutive characters which share a second common formatting that is different from the first common formatting in the first one of the plurality of text runs.

13. A computing device for stateful editing of rich content in a webpage using a text box, comprising:
   a memory for storing executable program code; and
   a processor, functionally coupled to the memory, the processor being responsive to computer-executable instructions contained in the program code and operative to:
      receive a plurality of unformatted characters for addition to unformatted content in the text box for updating formatted text content in the rich content, the rich content comprising both formatted text content and non-text content displayed in the webpage;
      track, via a data structure, an insertion point location within the text box while receiving the plurality of characters;
      track, via the data structure, parts of the unformatted content in the text box that received the plurality of unformatted characters;
      maintain a record of formatting properties of the rich content in the webpage;
      track an insertion point location associated with each input of the plurality of unformatted characters to the unformatted content in the text box;
      compare the unformatted content in the text box, including the plurality of unformatted characters, to the formatted text content in the webpage to identify additions, removals or replacement for the formatted text content and to identify formatting properties associated with the formatted text content to be applied to the unformatted content in the text box;
      determine an update to be applied to the rich content based on tracking the insertion point associated with each unformatted character input to the unformatted content in the text box and based on the comparison of the unformatted content in the text box to the formatted text content; and
      in response to the update determination, apply the update to the rich content, wherein applying the update to the rich content of the webpage comprises:
         identify a plurality of text runs in the rich content;
         identifying, based on the insertion point, one of the plurality of text runs in the rich content for receiving the unformatted text content in the text box, which includes the plurality of unformatted characters; and
         formatting the unformatted text content in the text box, which includes the plurality of unformatted characters, with the identified formatting properties and adding, removing, or replacing the formatted text content with the unformatted text content in the text box with the identified formatting properties.

14. The computing device of claim 13, wherein each of the identified text runs includes a different formatting property.

15. The computing device of claim 13, wherein the plurality of unformatted characters in the text box comprises one or more glyphs.

16. The computing device of claim 13, wherein the text content comprises a plurality of text runs,
   wherein a first one of the plurality of text runs comprises a first set of continuous and consecutive text characters which share a first common formatting property and a second one of the plurality of text runs comprises a second set of continuous and consecutive characters which share a second common formatting property that is different from the first common formatting property in the first one of the plurality of text runs.

* * * * *